(12) United States Patent
Rodriguez et al.

(10) Patent No.: US 12,258,696 B2
(45) Date of Patent: Mar. 25, 2025

(54) LAUNDRY TREATMENT APPLIANCE AND METHOD OF IDENTIFYING A LAUNDRY TREATMENT APPLIANCE

(71) Applicant: Haier US Appliance Solutions, Inc., Wilmington, DE (US)

(72) Inventors: Efren Rodriguez, Louisville, KY (US); Jason Fuchs, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 304 days.

(21) Appl. No.: 17/829,529

(22) Filed: Jun. 1, 2022

(65) Prior Publication Data

US 2023/0392315 A1 Dec. 7, 2023

(51) Int. Cl.
*D06F 34/05* (2020.01)
*G05B 19/042* (2006.01)

(52) U.S. Cl.
CPC ........... *D06F 34/05* (2020.02); *G05B 19/042* (2013.01); *G05B 2219/2633* (2013.01)

(58) Field of Classification Search
CPC .............................. D06F 34/05; G05B 19/042
See application file for complete search history.

(56) References Cited

U.S. PATENT DOCUMENTS

| | | | |
|---|---|---|---|
| 9,020,769 B2 | 4/2015 | Rada et al. | |
| 9,888,452 B2 | 2/2018 | Logan et al. | |
| 10,705,494 B2 | 7/2020 | Ha | |
| 11,098,430 B2 | 8/2021 | Belveal et al. | |
| 2001/0025392 A1* | 10/2001 | Youn | D06F 34/28 68/12.02 |
| 2014/0132411 A1 | 5/2014 | Buchheim et al. | |
| 2016/0232499 A1* | 8/2016 | Berman | G07F 9/001 |
| 2017/0082991 A1* | 3/2017 | Belveal | D06F 39/00 |
| 2021/0165377 A1* | 6/2021 | Yoon | D06F 34/28 |

FOREIGN PATENT DOCUMENTS

JP 2007037616 A 2/2007
WO WO-2018046426 A1 * 3/2018

* cited by examiner

*Primary Examiner* — Daniel Samwel
(74) *Attorney, Agent, or Firm* — Dority & Manning, P.A.

(57) ABSTRACT

A laundry treatment appliance includes a cabinet defining a receiving space, a tub provided within the receiving space, a user interface provided on the cabinet, the user interface including one or more indicators, and a controller operably coupled to the user interface, the controller comprising a wireless communication module, the controller being configured to direct a notification operation. The notification operation includes exchanging a communication signal with a remote server, establishing a wireless remote connection between the laundry treatment appliance and a remote terminal in response to exchanging the communication signal with the remote server, and outputting a unique identifier via the user interface to observably distinguish the laundry treatment appliance in response to establishing the wireless remote connection.

18 Claims, 3 Drawing Sheets

LAUNDRY TREATMENT APPLIANCE AND METHOD OF IDENTIFYING A LAUNDRY TREATMENT APPLIANCE

FIELD OF THE INVENTION

The present subject matter relates generally to laundry treatment appliances, and more particularly to identifying a particular laundry treatment appliance within a group.

BACKGROUND OF THE INVENTION

Laundry treatment appliances typically include washing machines, dryers, and combination washing machine/dryers. The laundry treatment appliances are configured to perform one or more laundry operations, such as washing, rinsing, soaking, or drying. In some circumstances, many laundry treatment appliances may be located within the same general area, such as a laundromat or laundry complex. Each of these laundry treatment appliances may closely resemble one another such that it may be difficult to tell them apart.

Customers or users of one laundry treatment appliance among the plurality may be able to reserve the machine beforehand, ensuring availability and streamlining the laundry process. Since the laundry treatment appliances all look similar, it can be difficult to discern which machine is the reserved machine. Similarly, owners of the laundry treatment appliances may receive reports of faults or failures in one of the laundry treatment appliances. In order to find the machine that is experiencing the fault, a technician must inspect each machine until the faulty one is found, by examining serial numbers, performing tests, or the like.

Accordingly, a laundry treatment appliance that obviates one or more of the above-mentioned drawbacks would be beneficial. In particular, a laundry treatment appliance or method of operating a laundry treatment appliance that allows for quick identification of one of a plurality of laundry treatment appliances would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a laundry treatment appliance is provided. The laundry treatment appliance may include a cabinet defining a receiving space, a tub provided within the receiving space, a user interface provided on the cabinet, and a controller operably coupled to the user interface, the controller including a wireless communication module, the controller being configured to direct a notification operation. The notification operation may include exchanging a communication signal with a remote server, establishing a wireless remote connection between the laundry treatment appliance and a remote terminal in response to exchanging the communication signal with the remote server, and outputting a unique identifier via the user interface to observably distinguish the laundry treatment appliance in response to establishing the wireless remote connection, the unique identifier including one or more indicators.

In another exemplary aspect of the present disclosure, a method of operating a laundry treatment appliance is provided. The laundry treatment appliance may include a cabinet and a user interface provided on the cabinet. The method may include exchanging a communication signal with a remote server, establishing a wireless remote connection between the laundry treatment appliance and a remote terminal in response to exchanging the communication signal with the remote server, and outputting a unique identifier via the user interface to observably distinguish the laundry treatment appliance in response to establishing the wireless remote connection.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
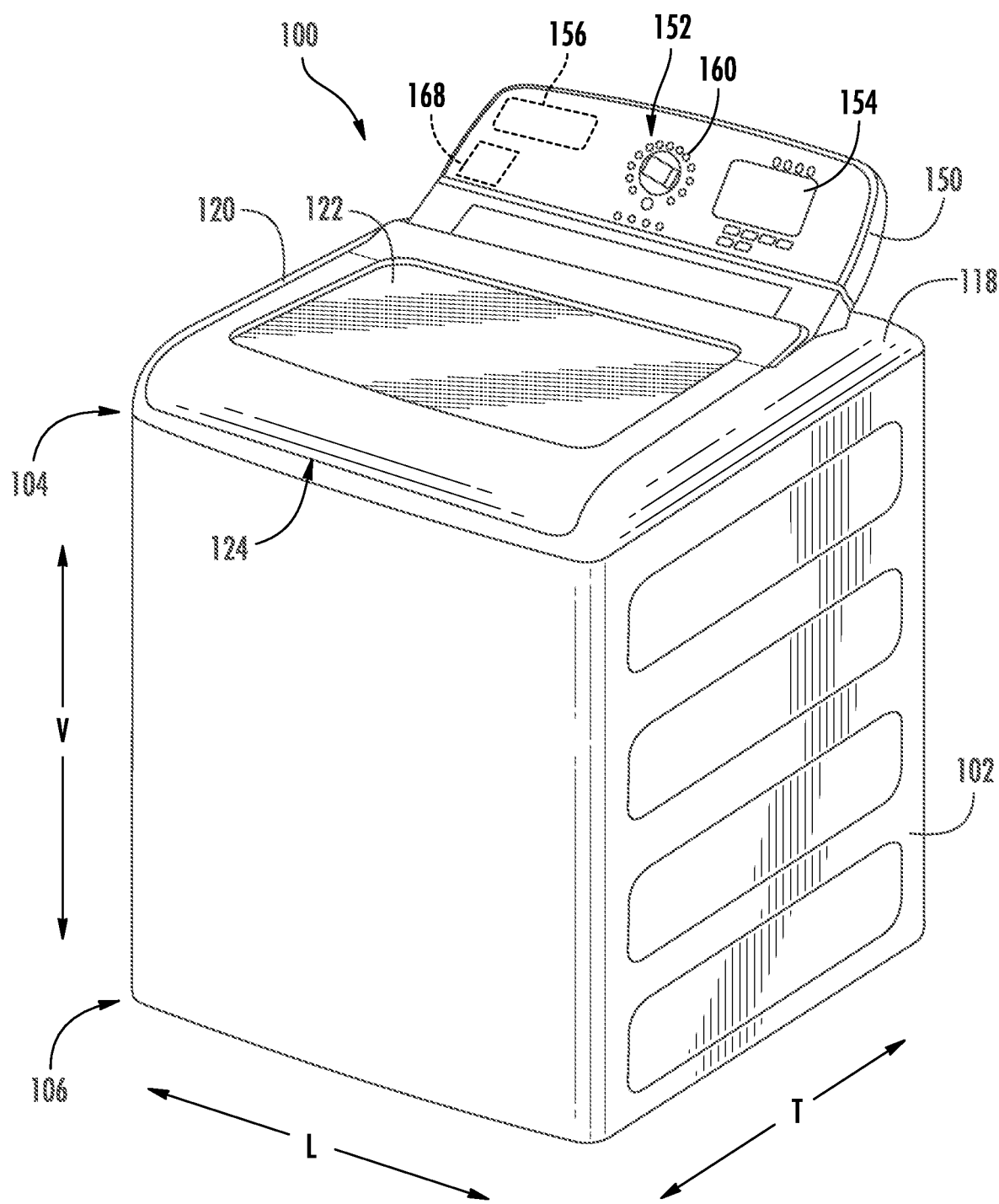
FIG. 1 provides a perspective view of a laundry treatment appliance with a door in a closed position according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
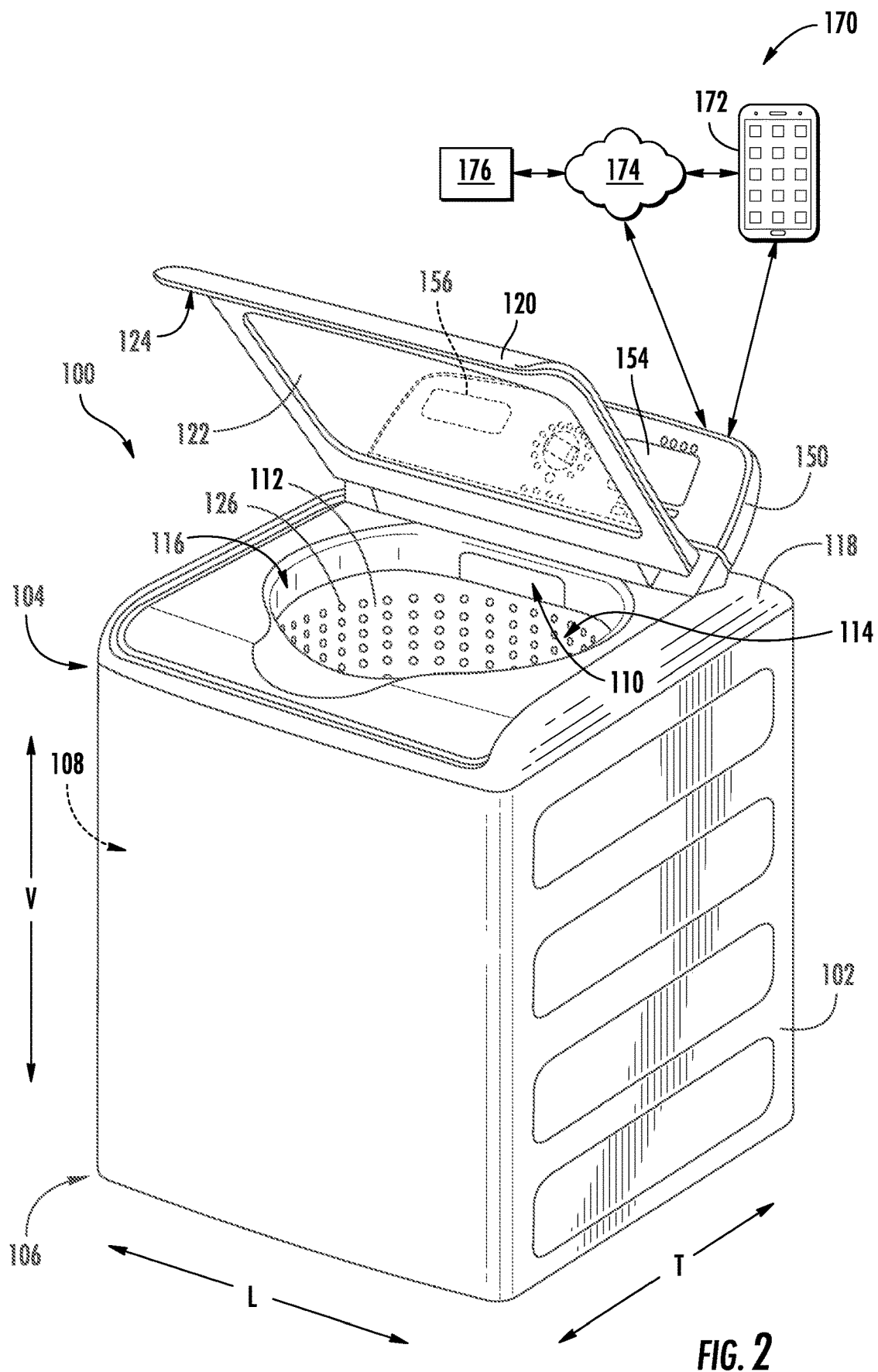
FIG. 2 provides a perspective view of the exemplary laundry treatment appliance of FIG. 1 with the door in an open position.

FIGS. 1 and 2 illustrate an exemplary embodiment of a vertical axis laundry appliance or laundry treatment apparatus 100. Specifically, FIGS. 1 and 2 illustrate perspective views of laundry appliance 100 in a closed and an open position, respectively. Laundry appliance 100 generally defines a vertical direction V, a lateral direction L, and a transverse direction T, each of which is mutually perpendicular, such that an orthogonal coordinate system is generally defined.

While described in the context of a specific embodiment of a vertical axis laundry appliance, it should be appreciated that vertical axis laundry appliance 100 is provided by way of example only. It will be understood that aspects of the present subject matter may be used in any other suitable laundry appliance, such as a horizontal axis laundry appliance. Indeed, modifications and variations may be made to laundry appliance 100, including different configurations, different appearances, and/or different features while remaining within the scope of the present subject matter. Moreover, aspects of the present subject matter may be implemented using any suitable user interface of any residential or commercial appliance.

Laundry appliance 100 has a cabinet 102 that extends between a top portion 104 and a bottom portion 106 along the vertical direction V. A tub 108 may be positioned within cabinet 102 and is generally configured for retaining wash fluids during an operating cycle. Laundry appliance 100 may further include a primary dispenser 110 (FIG. 2) for dispensing wash fluid into tub 108. The term "wash fluid" refers to a liquid used for washing and/or rinsing articles during an operating cycle and may include any combination of water, detergent, fabric softener, bleach, and other wash additives or treatments.

In addition, laundry appliance 100 may include a basket 112 that is positioned within tub 108 and generally defines a chamber 114 including an opening 116 for receipt of articles for laundering. More specifically, basket 112 may be rotatably mounted within tub 108 such that it is rotatable about an axis of rotation A. According to the illustrated embodiment, the axis of rotation A is substantially parallel to the vertical direction V. In this regard, laundry appliance 100 is generally referred to as a "vertical axis" or "top load" laundry appliance 100. However, as noted above, it should be appreciated that aspects of the present subject matter may be used within the context of a horizontal axis or front load laundry appliance as well.

As illustrated, cabinet 102 of laundry appliance 100 has a top panel 118. Top panel 118 defines an opening (FIG. 2) that coincides with opening 116 of basket 112 to permit a user access to basket 112. Laundry appliance 100 further includes a door 120 which is rotatably mounted to top panel 118 to permit selective access to opening 116. In particular, door 120 selectively rotates between the closed position (as shown in FIG. 1) and the open position (as shown in FIG. 2). In the closed position, door 120 inhibits access to basket 112. Conversely, in the open position, a user can access basket 112. A window 122 in door 120 permits viewing of basket 112 when door 120 is in the closed position, e.g., during operation of laundry appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIG. 2, basket 112 further defines a plurality of perforations 126 to facilitate fluid communication between an interior of basket 112 and tub 108. In this regard, basket 112 may be spaced apart from tub 108 to define a space for wash fluid to escape chamber 114. During a spin cycle, wash fluid within articles of clothing and within chamber 114 is urged through perforations 126 wherein it may collect in a sump defined by tub 108. Laundry appliance 100 may further include a drain pump assembly that is located beneath tub 108 and basket 112 for gravity assisted flow when draining tub 108, e.g., after a wash or rinse cycle.

Referring to FIGS. 1 and 2, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation, as will be described below. Accordingly, control panel 150 may be referred to as a user interface hereinafter. Additionally or alternatively, input selector 152 may be referred to as a control knob.

Operation of laundry appliance 100 is controlled by a controller or processing device 156 that is communicatively coupled with control panel 150 for user manipulation to select laundry cycles and features. In response to user manipulation of control panel 150, controller 156 operates the various components of laundry appliance 100 to execute selected machine cycles and features. Controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of laundry appliance 100 may be in communication with controller 156 via one or more signal lines or shared communication busses.

Display 154 may be a screen. For instance, display 154 may be a liquid crystal display (LCD) screen, capable of displaying complex graphics, text, and pictures. Additionally or alternatively, display 154 may be a touch display. In detail, display 154 may be capable of receiving touch inputs directly to a face thereof to be sent to controller 156. However, display 154 may be a simple display. For instance, display 154 may include one or more seven-segment LED arrangements. The one or more seven-segment LED arrangements may be controllable (e.g., via controller 156) to display certain characters (e.g., numbers, letters, etc.) at predetermined times.

Control panel 150 may further include one or more stand-alone LEDs 160. In detail, the LEDs 160 may be positioned at various location on control panel 150 (or otherwise on cabinet 102). According to one embodiment, LEDs 160 are arranged circumferentially around a control input (e.g., input selector 152). However, according to some embodiments, a single LED 160 is provided on control panel 150 at a predetermined position. The one or more LEDs may be operably connected with controller 156 to be selectively illuminated at predetermined times, as will be described below. The one or more LEDs may be single color LEDs, multi-color LEDs, variable brightness LEDs, or the like. Thus, the one or more LEDs 160 may provide a visual output to, for instance, a user of laundry treatment appliance 100, via pulsating patterns, color patterns, sequence patterns, brightness patterns, or the like.

Control panel 150 may include a speaker 168. Speaker 168 may be any suitable speaker or transducer capable of emitting audio signals. As described above, speaker 168 may be associated with smart software to provide information and assistance to users via audio prompts. Speaker 168 may also output various alerts and tones. For instance, speaker 168 may play tones to signal a cycle end time, a fault of the appliance, a timer conclusion or warning, or the like. Speaker 168 may be fully integrated with control panel 150. In some embodiments, speaker 168 is arranged within cabinet 102 (e.g., within top panel 118). It should be understood that a precise location of speaker 168 may vary according to specific embodiments.

Referring still to FIG. 2, a schematic diagram of an external communication system 170 will be described according to an exemplary embodiment of the present subject matter. In general, external communication system 170 is configured for permitting interaction, data transfer, and other communications between appliance 100 and one or more external devices. For example, this communication may be used to provide and receive operating parameters, user instructions or notifications, performance characteristics, user preferences, or any other suitable information for improved performance of appliance 100. In addition, it should be appreciated that external communication system 170 may be used to transfer data or other information to improve performance of one or more external devices or appliances and/or improve user interaction with such devices.

For example, external communication system 170 permits controller 156 of appliance 100 to communicate with a separate device external to appliance 100, referred to generally herein as an external device 172. As described in more detail below, these communications may be facilitated using a wired or wireless connection, such as via a network 174. In general, external device 172 may be any suitable device separate from appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control appliance 100, etc. In addition, external device 172 and remote server 176 may communicate with appliance 100 to communicate similar information.

In general, communication between appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Now that the construction of laundry treatment appliance 100 and external communication system 170 have been presented according to exemplary embodiments, an exemplary method 300 of operating a laundry treatment appliance will be described. Although the discussion below refers to the exemplary method 300 of operating appliance 100, one skilled in the art will appreciate that the exemplary method 300 is applicable to the monitoring and control of any suitable laundry treatment appliance or system of laundry appliances. In exemplary embodiments, the various method steps as disclosed herein may be performed by controller 156, remote server 176, and/or a separate, dedicated controller.

Figure 3:
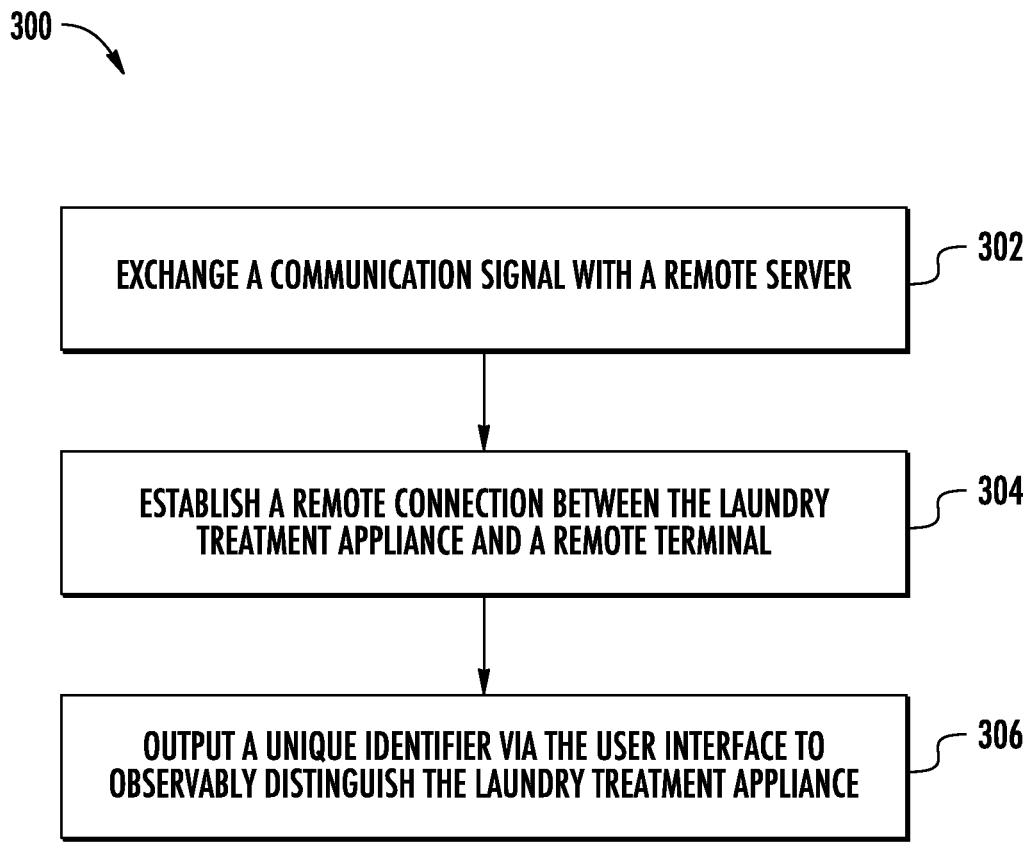
FIG. 3 provides a flow chart illustrating a method of operating a laundry treatment appliance according to exemplary embodiments of the present disclosure.

Referring generally to FIG. 3, a method of operating a laundry treatment appliance (e.g., laundry treatment appliance 100) is provided. In exemplary embodiments, the controller 156 may be operable to perform various steps of a method (e.g., 300) in accordance with the present disclosure. The method 300 may occur as, or as part of, a laundry operation of a laundry treatment appliance (e.g., laundry treatment appliance 100).

It is noted that the order of steps within method 300 are for illustrative purposes. Except as otherwise indicated, one or more steps in the below method 300 may be changed, rearranged, performed in a different order, or otherwise modified without deviating from the scope of the present disclosure.

At step 302, method 300 may include exchanging a communication signal with a remote server. In detail, a laundry treatment appliance (e.g., laundry treatment appliance 100) may send or receive a communication signal to or from a remote server (e.g., remote server 176). The communication signal may be a data signal containing one or more information packets. The communication signal may be exchanged wirelessly (e.g., via a wireless communication module). For one example, the communication signal is transmitted from the laundry treatment appliance to the remote server and may contain one or more fault or error codes. The error codes may be related to an operational status or performance metric of the laundry treatment appliance (e.g., a drain fault, a tub misalignment, an electrical fault, etc.). Accordingly, in some embodiments, the communication signal is then transmitted to an appropriate response technician (e.g., to a corresponding remote terminal from the remote server).

According to another example, the communication signal is transmitted from the remote server to the laundry treatment appliance and may contain a reservation request. In detail, a user may wish to reserve a laundry treatment appliance within, for example, a public laundromat for a laundry operation (e.g., washing, drying, etc.). The communication signal may then be received by the laundry treatment appliance (e.g., via the wireless communication module). Accordingly, the laundry treatment appliance may then register the reservation for future use. For instance, the laundry treatment appliance may lock out controls or operation for any other user besides the user who initiated the reservation. The user who initiated the reservation may be notified of a code or input sequence to input to the laundry treatment appliance to enable the controls and perform a laundry operation. Thus, the laundry treatment appliance may be placed in a "reserved" state until unlocked by the user who initiated the reservation.

At step 304, method 300 may include establishing a wireless remote connection between the laundry treatment appliance and a remote terminal. For instance, in response to sending or receiving the communication signal, the laundry treatment appliance may initiate a wireless connection mode or sequence, such that the laundry treatment appliance is able to connect wirelessly with the remote terminal (e.g., external device 172). For example, the laundry treatment appliance communicates with the remote terminal through a wireless two-way communication, as would be understood in the art. Thus, the remote device may be different from the remote server with which the communication signal was exchanged.

With reference to the first example given above, the remote terminal may be a mobile phone or laptop of a repair technician or serviceperson. Accordingly, a wireless remote connection may be established between the laundry treatment appliance and the mobile phone or laptop. According to some embodiments, the wireless remote connection may be a WiFi® connection, a Bluetooth® connection, or the like (e.g., as described above). For instance, the laundry treatment appliance and the remote terminal may communicate with each other without the use of a connecting wire.

With reference to the second example given above, the remote terminal may be a mobile phone or tablet (or the like) of the user of the laundry treatment appliance. Accordingly, a wireless remote connection may be established between the laundry treatment appliance and the mobile phone or tablet. According to some embodiments, the wireless remote connection may be a WiFi® connection, a Bluetooth® connection, or the like (e.g., as described above). For instance, the laundry treatment appliance and the remote terminal may communicate with each other without the use of a connecting wire. Additionally or alternatively, a wireless connection point may be used (e.g., a wireless router).

The user may select the appropriate laundry treatment appliance via the communication signal. In detail, in the case where the communication signal is a fault code or error code, the communication signal may include the specific model or identification number of the unit (e.g., ABCD-123). For example, the communication signal may be a text or image provided to the remote terminal via a text message, an email, or through an application (app). Thus, the user is notified of a particular unit which needs to be serviced. For instance, in a commercial case, a plurality of laundry treatment appliances may be provided within a single location. Similarly, in the case where the communication signal is the reservation request, the laundry treatment appliance may notify the user as to which unit has been reserved (e.g., via the model or identification number or code). For instance, the laundry treatment appliance may exchange a second communication signal (e.g., to the remote terminal) with a notification text or image indicating the specific unit (e.g., through the app).

In some embodiments, the laundry treatment appliance receives a command signal from the remote terminal in response to establishing the remote connection. For instance, the command signal may be a request or command for the laundry treatment appliance to enter a predetermined mode of operation. The predetermined mode of operation may allow the laundry treatment appliance to perform one or more actions to identify itself visually to the user (e.g., commercial user or technician). Accordingly, the predetermined mode of operation may be referred to as a "Find", "Locate", "Discover", "Alert", or other distinguishing mode. For purposes of this disclosure, the predetermined mode of operation is referred to as a Find mode.

At step 306, method 300 may include outputting a unique identifier via the user interface to observably distinguish the laundry treatment appliance. In detail, in response to establishing the wireless remote connection and receiving the command signal, the laundry treatment appliance may output or otherwise emit the unique identifier in a manner to be perceived by the user. The unique identifier may include one or more indicators, for instance. A first indicator of the unique identifier may be a visual indicator. The user interface may include a screen (e.g., display 154). The first indicator may be displayed on the screen. For example, the first indicator of the unique identifier is a string of text including characters such as letters, numbers, words, punctuation, or symbols. The first indicator may be displayed in one of a plurality of manners. For instance, the first indicator may be scrolled across the screen (or display screen) repeatedly. Other manners of displaying the first indicator may include flashing the string of text (e.g., according to a pattern), pulsating the string of text, or displaying the string of text in alternating sizes, colors, shapes, or the like. The first indicator may be output individually or in tandem with additional indicators. The first indicator may be repeated a predetermined number of times. For example, the first indicator is repeated until the laundry treatment appliance is manipulated by the user.

A second indicator of the unique identifier may also be a visual indicator. The user interface (or the laundry treatment appliance in general) may include one or more light emitting diodes (e.g., LEDs 160). The second indicator may include illuminating or otherwise activating the one or more LEDs according to a predetermined pattern or intensity. For instance, the laundry treatment appliance may include a plurality of LEDs surrounding a control knob. The second indicator may include illuminating each of the plurality of LEDs in a sequential pattern. Additionally or alternatively, the plurality of LEDs may be multicolor LEDs. The second indicator may thus include a flashing, pulsing, sequential activation, or other unique illumination of the plurality of LEDs in different colors. Moreover, the second indicator may include a particular color scheme or pattern. The second indicator may be repeated a predetermined number of times. For example, the second indicator is repeated until the laundry treatment appliance is manipulated by the user.

A third indicator of the unique identifier may be an audio indicator. In detail, the user interface (or the laundry treatment appliance in general) may include a speaker (e.g., speaker 168). The speaker may selectively output sounds or noises within an audible range. Additionally or alternatively, the speaker may selectively output sounds at a higher or lower frequency than an audible range. The speaker may output a predetermined tone as the third indicator. It should be understood that the third indicator may include any reasonable or suitable audio output, such as a voice alert, alarm, siren, buzz, or the like. As mentioned above, the third indicator may be used individually or in conjunction or tandem with the first indicator, the second indicator, the first and second indicators, or any additional indicators. Additionally or alternatively, the predetermined tone may include an ultrasonic output which may be detected by ultrasonic detectors (e.g., within the remote terminal). The third indicator may include a combination on audible and ultrasonic outputs. The third indicator may be repeated a predetermined number of times. For example, the third indicator is repeated until the laundry treatment appliance is manipulated by the user.

The unique identifier may additionally be presented to the user (e.g., via the remote terminal). For example, upon assigning, initiating, and outputting the unique identifier, the laundry treatment appliance sends a notification to the remote terminal with a copy of the unique identifier. Accordingly, the user is informed of what to look for, listen for, or otherwise observe or perceive from the laundry treatment appliance.

Advantageously, when the laundry treatment appliance is provided among a plurality of identical or nearly identical laundry treatment appliances, the unique identifier may be output or otherwise emitted to provide easy identification to a user. In the case of a particular laundry treatment appliance requiring service or repair, a repair technician may easily identify the laundry treatment appliance needing assistance without having to check each individual serial number. Moreover, in the case of a commercial user reserving a particular laundry treatment appliance, the user may easily identify the reserved machine without checking each identification number.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry treatment appliance, comprising:
   a cabinet defining a receiving space;
   a tub provided within the receiving space;
   a user interface provided on the cabinet; and
   a controller operably coupled to the user interface, the controller comprising a wireless communication module, memory, and a microprocessor configured to direct a notification operation, the notification operation comprising
   exchanging a communication signal with a remote server;
   establishing a wireless remote connection between the laundry treatment appliance and a remote terminal in response to exchanging the communication signal with the remote server;
   receiving a command signal from the remote terminal in response to establishing the wireless remote connection, the command signal comprising:
   a command for the laundry treatment appliance to enter a predetermined mode of operation; and
   a command to output the unique identifier; and
   outputting a unique identifier via the user interface to observably distinguish the laundry treatment appliance in response to establishing the wireless remote connection, the unique identifier comprising one or more indicators.

2. The laundry treatment appliance of claim 1, wherein the laundry treatment appliance is a first laundry treatment appliance among a plurality of laundry treatment appliances.

3. The laundry treatment appliance of claim 1, wherein the user interface comprises a display, and wherein one indicator of the one or more indicators comprises a message displayed across the display.

4. The laundry treatment appliance of claim 1, wherein the user interface comprises one or more light emitting diodes (LEDs), and wherein one indicator of the one or more indicators comprises a predetermined flashing pattern of the one or more LEDs.

5. The laundry treatment appliance of claim 1, further comprising a speaker operably coupled with the controller.

6. The laundry treatment appliance of claim 5, wherein one indicator of the one or more indicators comprises an audio output via the speaker.

7. The laundry treatment appliance of claim 1, wherein the remote terminal is a mobile device associated with a unique user.

8. The laundry treatment appliance of claim 1, wherein the communication signal comprises one or more fault or error codes generated within the laundry treatment appliance; and the notification operation further comprising:
transmitting the communication signal to an appropriate response technician.

9. The laundry treatment appliance of claim 1, wherein the communication signal comprises a reservation request from the remote server.

10. A method of operating a laundry treatment appliance, the laundry treatment appliance comprising a cabinet and a user interface provided on the cabinet, the method comprising:
exchanging a communication signal with a remote server;
establishing a wireless remote connection between the laundry treatment appliance and a remote terminal in response to exchanging the communication signal with the remote server;
receiving a command signal from the remote terminal in response to establishing the wireless remote connection, the command signal comprising:
a command for the laundry treatment appliance to enter a predetermined mode of operation; and
a command to output the unique identifier; and
outputting a unique identifier via the user interface to observably distinguish the laundry treatment appliance in response to establishing the wireless remote connection.

11. The method of claim 10, wherein the laundry treatment appliance is a first laundry treatment appliance among a plurality of laundry treatment appliances.

12. The method of claim 10, wherein the user interface comprises a display, and wherein the unique identifier comprises a message displayed across the display.

13. The method of claim 10, wherein the user interface comprises one or more light emitting diodes (LEDs), and wherein the unique identifier comprises a predetermined flashing pattern of the one or more LEDs.

14. The method of claim 10, wherein the user interface comprises a speaker operably coupled with a controller.

15. The method of claim 14, wherein the unique identifier comprises an audio output via the speaker.

16. The method of claim 10, wherein the remote terminal is a mobile device associated with a unique user.

17. The method of claim 10, wherein the communication signal comprises one or more fault or error codes generated within the laundry treatment appliance; and
the notification operation further comprising:
transmitting the communication signal to an appropriate response technician.

18. The method of claim 10, wherein the communication signal comprises a reservation request from the remote server.

* * * * *